United States Patent
Copsey (10) Patent No.: US 9,419,963 B2
(45) Date of Patent: Aug. 16, 2016

(54) SYSTEM AND METHOD FOR CONTROLLING ACCESS

(71) Applicant: Open Text S.A., Luxembourg (LU)

(72) Inventor: Simon Dominic Copsey, Horsham (GB)

(73) Assignee: Open Text S.A., Luxembourg (LU)

( * ) Notice: Subject to any disclaimer, the term of this patent is extended or adjusted under 35 U.S.C. 154(b) by 27 days.

(21) Appl. No.: 14/322,614

(22) Filed: Jul. 2, 2014

(65) Prior Publication Data

US 2015/0012990 A1  Jan. 8, 2015

Related U.S. Application Data

(60) Provisional application No. 61/842,226, filed on Jul. 2, 2013.

(51) Int. Cl.
*G06F 17/30* (2006.01)
*G06F 15/16* (2006.01)
*G06F 7/04* (2006.01)
*H04L 29/06* (2006.01)

(52) U.S. Cl.
CPC ........... *H04L 63/0815* (2013.01); *H04L 63/083* (2013.01); *H04L 63/0876* (2013.01)

(58) Field of Classification Search
CPC ... H04L 29/06; H04L 63/0815; H04L 63/083; H04L 63/0876

USPC ............................................................ 726/7
See application file for complete search history.

(56) References Cited

U.S. PATENT DOCUMENTS

| | | | | |
|---|---|---|---|---|
| 6,609,198 B1 * | 8/2003 | Wood | ...................... | G06F 21/31 713/155 |
| 6,892,307 B1 * | 5/2005 | Wood | ...................... | G06F 21/41 713/155 |
| 2009/0265769 A1 * | 10/2009 | Lu | ........................ | G06F 17/243 726/6 |
| 2014/0068702 A1 * | 3/2014 | Hyndman | ........... | H04L 63/0815 726/1 |

OTHER PUBLICATIONS

Jennifer G. Steiner; Kerberos: An Authentication Service for Open Network Systems; year:1998; VGLAB; p. 1-15.*

* cited by examiner

*Primary Examiner* — Monjour Rahim
(74) *Attorney, Agent, or Firm* — Sprinkle IP Law Group (57) ABSTRACT

Systems and methods for controlling access to multiple applications on a computing device are provided. One embodiment of a system includes an access device configured to: receive a request to access a first application and a device identifier; authenticate the user using a user credential associated with the user and store the device identifier in association with a login identifier in response to authentication of the user. The access device can be further configured to receive a request to access a second application and the device identifier. The access device can allow access to the second application based on the previous authentication of the user.

25 Claims, 6 Drawing Sheets

SYSTEM AND METHOD FOR CONTROLLING ACCESS

RELATED APPLICATIONS

This application claims under 35 U.S.C. §119(e) the benefit of and priority to U.S. Provisional Patent Application No. 61/842,226, filed Jul. 2, 2013, entitled "System and Method for Controlling Access," which is hereby fully incorporated by reference herein.

TECHNICAL FIELD

This disclosure relates generally to systems and methods for controlling access over a network. Specifically, this disclosure relates to systems and methods for implementing access controls in conjunction with multiple applications on a device based on an identifier associated with that device.

BACKGROUND

In today's heterogeneous computing environments, users may have multiple computing devices (e.g., mobile devices, tablet, laptop, desktop computer, etc.) with multiple applications available to the user on each device, where those devices may, in turn, be used in multiple environments or locales. Complicating this situation, in many instances a user may have different user credentials (e.g., login information such as a username or password or other types of identifiers for a user) that may be utilized with these different applications, computing devices, etc. While users may often need to access these multiple applications, it is inconvenient for them to have to provide their user credentials in conjunction with the use of each application.

SUMMARY

A method for controlling access to a target system in accordance with embodiments includes an access device receiving a first request over a network from a user device, the first request comprising a request on behalf of a first application on the user device to access a platform, the first request including a device identifier uniquely identifying the user device; the access device authenticating a user of the user device using a user credential associated with the user; the access device storing the device identifier in association with a login identifier in response to authentication of the user; the access device receiving a second request from the user device over the network, the second request comprising a request on behalf of a second application on the user device to access the platform, the second request including the device identifier; the access device determining that the user has previously authenticated based on a match between the device identifier received in the second request and the device identifier stored in association with the login identifier; and the access device allowing the second application to access to the platform based on the determination that the user previously authenticated.

In some embodiments, the method includes the access device sending a user credential request and the login identifier to the first application in response to the first request and receiving a response including a user credential and the login identifier from the first application. In some embodiments, the method includes the first application on the user device using the login identifier in subsequent accesses to the platform to access application data associated with the first application. In some embodiments, the method includes the access device sending the login identifier to the second application in response to determining that the user previously authenticated; the second application on the user device using the login identifier in subsequent accesses to the platform to access application data associated with the second application.

In some embodiments, allowing the second application to access to the platform comprises the access device logging in to the platform on behalf of the second application. In some embodiments, the first application and second application are independent applications. In some embodiments, the access device comprises a proxy server. In some embodiments, the method includes expiring the login identifier.

A system for controlling access to a target system in accordance with embodiments includes an access device in communication with a platform configured to: receive a first request from a user device, the first request comprising a request to access the platform on behalf of a first application on the user device, the first request including a device identifier that uniquely identifies the user device; authenticate a user of the user device using a user credential associated with the user; store the device identifier in association with a login identifier in response to authentication of the user; receive a second request from the user device, the second request comprising a request to access the platform on behalf of a second application on the user device, the second request including the device identifier; and compare the device identifier stored in association with the login identifier and the device identifier received in the second request and, in response to determining a match exists, allow access to the platform on behalf of the second application.

In some embodiments, the access device is configured to send a user credential request and the login identifier to the first application in response to the first request and receive a response including the user credential and the login identifier from the first application. In some embodiments, the access device is configured to send the login identifier to the second application in response to determining that the user previously authenticated. In some embodiments, the user device is coupled to the access device by the network, and the first application and second application are independent applications on the user device. In some embodiments, the first application is configured to receive the login identifier from the access device and use the login identifier in subsequent accesses to the platform to access application data associated with the first application. In some embodiments, the second application is configured to receive the login identifier from the access device and use the login identifier in subsequent accesses to the platform to access application data associated with the second application.

In some embodiments, the access device is configured to log in to the platform on behalf of the second application. In some embodiments, the access device is configured to expire the login identifier. In some embodiments, the access device comprises a proxy server.

A computer program product according to some embodiments includes a non-transitory computer readable medium storing a set of computer instructions executable by a processor to perform a method including: receiving a first request over a network from a user device, the first request comprising a request on behalf of a first application on the user device to access a platform, the first request including a device identifier that uniquely identifies the user device; authenticating a user of the user device using a user credential associated with the user; storing the device identifier in association with a login identifier in response to authentication of the user; receiving a second request from the user device over the network, the second request comprising a request on behalf of a second application on the user device to access the platform, the second request including the device identifier; determining that the user has previously authenticated based on a match between the device identifier received in the second request and the device identifier stored in association with the login identifier; allowing the second application to access to the platform based on the determination that the user previously authenticated.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals designate the same components. The invention may be better understood by reference to one or more of these drawings in combination with the description presented herein. It should be noted that the features illustrated in the drawings are not necessarily drawn to scale.

DETAILED DESCRIPTION

Embodiments and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As noted above, problems arise when multiple applications each require provisioning of user credentials. Embodiments ameliorate these issues, among others, by allowing a user to access applications based on credentials provided previously in conjunction with a different application. Embodiments may be particularly useful in conjunction with mobile devices or other computing devices in which applications or "apps" are "sandboxed". When apps are sandboxed, access to user data and system resources is limited on a per-app basis. For example, apps can be isolated so that two apps on the same device and operating in the same operating system environment cannot locally share credentials or other security information with each other. This can prevent an attacker from exploiting security holes in one app to gain control of another app. However, isolating apps can hinder usability as each app accessing data over a network must undergo separate authentication, often requiring the user to enter user credentials in each app.

To that end, attention is now directed to the systems and methods for accessing applications presented herein. Specifically, in certain embodiments, a computing device used by a user to access applications may include a device identifier uniquely identifying the user device (e.g., a media access control (MAC) address or factory burned-in identifier, algorithmically generated identifier, etc.). An access device may be used to control access to multiple applications from such a user device using this device identifier.

In particular, in one embodiment, when a user accesses an application on their device, a request to access the application may be sent from the application on the user device to the access device. When the access device receives this access request the device identifier can be used to determine whether a user associated with the device has been previously authenticated.

If a user has not been previously authenticated, a user credential (e.g., username, password, other login information, etc.) may be requested from the user device. When the user credential is received from the user device, the user can be authenticated using the user credential, and a login identifier (e.g., a session identifier, a web socket identifier, etc.) stored in association with the device identifier.

Accordingly, if the user has been previously authenticated, the device identifier will be stored in association with this login identifier and when an access request containing the device identifier is received it can be determined that the user associated with the user device has been previously authenticated based on the stored device identifier and login identifier. Based on this determination the user may be allowed access to the application. As can be seen then, a user may be required to provide user credentials only if the user has not been previously authenticated on that device. By requiring a user to only provide user credentials a single time (at least for applications configured to communicate with the access device), the user may more conveniently access multiple applications on his device.

In some embodiments, as an added measure of security, an expiration time may be associated with the stored device identifier and login identifier when the user is initially authenticated such that the login identifier and device identifier may be removed or otherwise invalidated after the expiration of this time. By removing the login identifier and device identifier the user is required to be re-authenticated when an application is next accessed.

Embodiments as presented herein may thus have the advantage that multiple applications on a device may be utilized and only the first access of one of the applications will require the user to supply their credentials. Subsequent applications may be automatically accessed without providing user credentials. As access may be controlled using a device specific unique identifier that may be provided independently by each application, embodiments of this type of access control may be implemented across multiple device platforms with differing methods, capabilities and limitations.

Figure 1:
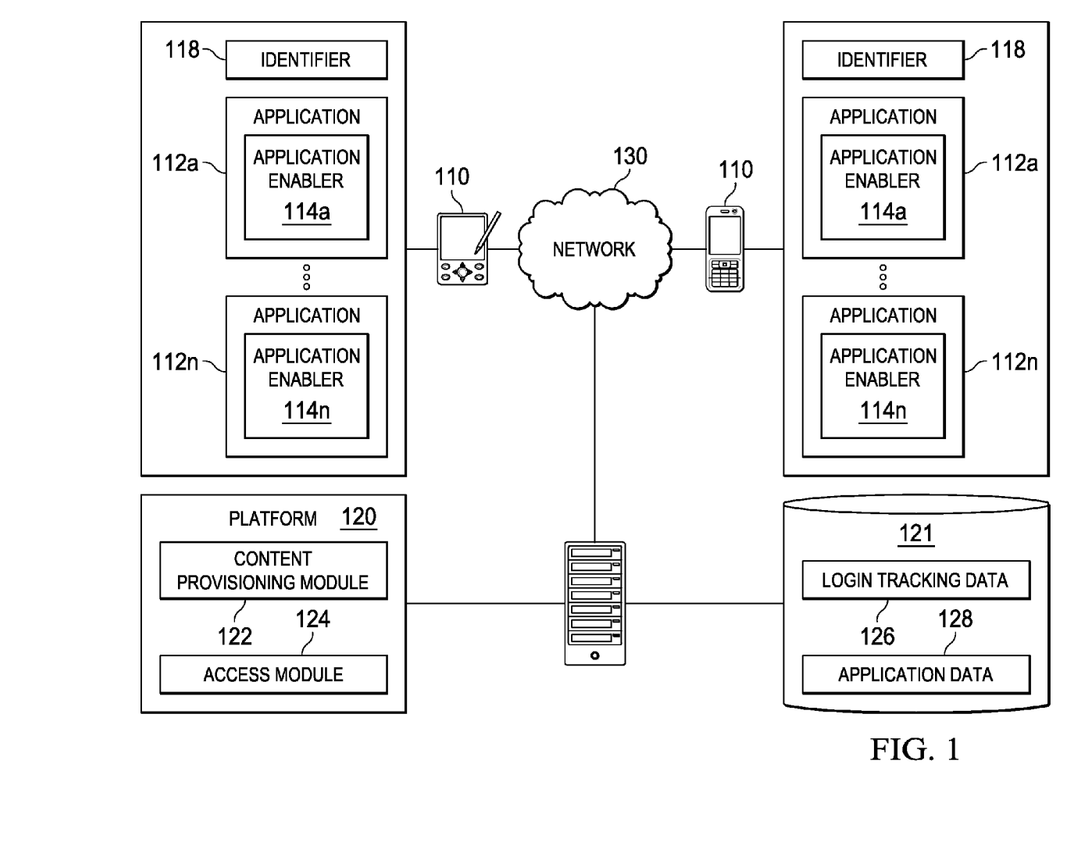
FIG. 1 is a block diagram illustrating one embodiment of a topology for access control.

It may now be helpful here to discuss various architectures that may be utilized in performing embodiments as disclosed herein. Referring first to FIG. 1, one embodiment of an architecture 100 for access control is depicted. The architecture 100 includes one or more computing devices 110 connected to a content provisioning platform 120 over a network 130. The network 130 may be a wired or wireless network such as the Internet, an intranet, a LAN, a WAN, a cellular network, another type of network. It will be understood that network 130 may be a combination of multiple different kinds of wired or wireless networks.

Platform 120 may include one or more content provisioning modules 122 accessible at one or more locations (e.g., IP addresses or domain names) or through one or more interfaces. The modules of a particular platform 120 may be deployed on physical computing devices residing at a particular location (such as those associated with a mobile application provider) or may be deployed in a cloud. Thus, when a platform 120 is deployed in the cloud, one or more content provisioning modules 122 may be executing on a virtual machine provided in the cloud, where the virtual machine is addressable at one (or more) location(s). In some embodiments, platform 120 may include an enterprise system comprising at least one enterprise application that accesses enterprise data.

Regardless of the location of the platform 120, the content provisioning module 122 of a platform 120 may support access from applications 112 (e.g., application 112a, application 112n) on a computing device 110 (referred to herein also as a user device). In other words, users at computing devices 110 may activate an application 112 on their computing device 110 to access content provisioning module 122 (or which may access content provisioning module 122 during execution, etc.). In response to such access, content provisioning module 122 may provide application data 128 from data store 121 to the accessing application 112 at the computing device 110. This data may include documents, including for example, files in a proprietary format (e.g., Adobe .pdf, Microsoft Word, Excel, Power Point), files in a generic open format (e.g., mp3, mpeg, jpeg, etc.) files in a markup language (XML, HTML etc.) or practically any other type of file, content or other data. Thus, for example, content provisioning module 122 may be a content management system that provides access, control and management of documents in data store 121.

To control access from applications 112 on computing devices 110 to content provisioning module 122, platform 120 may also include an access device comprising access module 124. As will be discussed in more detail at a later point herein, access module 124 may be configured to receive requests for access from applications 112 (which may be referred to as accessing an application), determine if a user at a computing device 110 has been authenticated, request and receive user credentials, authenticate a user, access (including store) login tracking data 126 and allow (or deny) access to content provisioning module 122.

Computing devices 110 may be mobile devices (such as smartphones, laptop computers, personal data assistants (PDAs), etc.), desktop computers, servers, or other computing platforms, or any other type of device that can process instructions and connect to network 130. Each of the devices 110 may include an identifier 118. Such an identifier 118 may uniquely identify the computing device 110. An identifier 118 may be, for example, a MAC address, a unique identifier associated with the SIM card of the device 110, Bluetooth ID of the device 110, a number or code placed in hardware of the device by a manufacturer of the device, etc. (or a combination thereof).

As described above, each computing device 110 may include multiple applications 112. In some embodiments, applications 112 on a particular computing device 110 may be independent from each other such that they cannot share user credentials. For example, in some embodiments, applications 112 on a particular computing device 110 may be sandboxed such that access to user data and system resources at computing device 110 is limited on a per-application basis. It can be appreciated that, in some cases, computing device 110 may further include other applications (not shown) that do not participate in the access control process.

Each application 112 may include an access enabler module 114 (e.g., access enabler module 114a, access enabler module 114n) configured to interact with access module 124 to control access to content provisioning module 122 of platform 120. Such an access enabler module 114 may, for example, be included by developers of applications 112 when developing the applications 112, be installed on the computing device 110 when the application 112 is deployed on the computing device 110, or included on computing device 110 in some other manner. It should be noted that while embodiments have been depicted herein as having one access enabler module 114 associated with each application 112, other embodiments may be configured differently (e.g., there may be one access enabler module 114 that may be utilized with all applications 112, etc.).

Access enabler module 114 may be configured to access the identifier 118 on the device 110, send a device identifier (which may be the same as identifier 118 or based on identifier 118) to the access module 124, receive a request for user credentials from the access module 124, send the user credentials to the access module 124, receive a login identifier from the access module 124 and provide the login identifier to an application 112 for use in accessing content from content provisioning module 122.

Accordingly, when a user of computing device 110 wishes to utilize an application 112a on his computing device 110 he may activate the application (e.g., tapping or clicking on an icon, using a command on a command line, etc.). At some point during execution of the application 112a then (e.g., on initial startup of the application 112a, when the application 112a first requires particular data, etc.) the application 112a may require access to content provisioning module 122.

When the application 112a first attempts to access content provisioning module 122, access enabler module 114a may access the identifier 118 on the computing device 110. The access enabler module 114a may then send a request to access that application (e.g., a request to access the content or other data associated with that application 112a) to content provisioning module 122, where the request includes a device identifier uniquely identifying that device 110. In one embodiment, access enabler module 114a may encrypt or otherwise perform an algorithmic calculation (e.g., a hash) based on the identifier 118 to generate the device identifier included with request, such that the device identifier included in the request is an encrypted, hashed or otherwise altered version of the identifier 118.

The request to access, including the device identifier is received from the computing device 110 at the access module 124. When such a request is received the access module 124 may determine whether a user associated with the device 110 has been previously authenticated. This determination may be made by determining if there is any login tracking data 126 associated with the device identifier included in the request received from the application 112a.

If there is no login tracking data 126 associated with the device identifier included in the received request, a request for a user credential may be returned to the access enabler module 114a from which the initial access request was received. Additionally, a login identifier to allow access to the content provisioning module 122 may be generated, or otherwise obtained, and returned to the access enabler module 114a in conjunction with the request for the user credential. A login identifier may be, for example a session identifier (session ID) or a web sockets identifier (web sockets ID).

The access enabler module 114a may then request a user credential from the user of the computing device 110 through the application 112a. This request may be initiated, for example, by presenting an interface (e.g., a login or authorization interface) associated with the application 112a. Such a user credential may, for example, be a username, password, an authorization token or key, etc.). The access enabler module 114a can then return the provided user credential to the access module 124 along with the login identifier.

When the user credential is received at the access module 124 from the access enabler module 114a at the computing device 110 the user may be authenticated using the user credential (e.g., by comparing the received user credential to authorized user credentials). It can be noted that, in some cases, a user may have the same authorized credentials for each application 112 or have different authorized credentials for different applications 112. If the user cannot be authenticated, an error message may be returned to the access enabler module 114a and the access enabler module 114a may attempt to repeat the authentication, deny a user access to the application 112a or take some other action.

If, however, the user credentials can be authenticated, access module 124 stores the login identifier in association with the device identifier (e.g., associated with computing device 110) received in the initial access request in login tracking data 126 to allow access to the content provisioning module 122. The application may thus utilize this login identifier in subsequent accesses to content provisioning module 122 to access the application data 128 associated with the application 112a.

It will be appreciated by those of ordinary skill in the art that a user's access to application data 128 may be limited based on security criteria and data policies. For example, a user may be prevented from accessing certain files based on the credentials provided, or may have full access to some files, but only write access to others and so on. Because access module 124 can maintain an association between credentials and login identifier, an indication of the association between a user and login identification can be provided to content provisioning module 122. Accordingly, content provisioning module 122 may enforce security criteria and data policies when application 112a uses a login identifier in the same manner as if the user had logged in to platform 120 using credentials such as a user name and password. Thus, for example, content provisioning module 122 may provide access to application data 128 based on enterprise security criteria and/or data policies.

At some subsequent point, then, a user of computing device 110 may wish to utilize a different application 112n on his computing device 110 (e.g., either simultaneously with the first application 112a or after the user has closed the first application 112a) and may activate the other application 112n (e.g., tapping or clicking on an icon, using a command on a command line, etc.). During execution of the application 112n (e.g., on initial startup of the application 112, when the application 112n first requires particular data, etc.) the application 112n may also require access to content provisioning module 122.

When this application 112n first attempts to access content provisioning module 122, access enabler module 114n may access the identifier 118 on the computing device 110. The access enabler module 114n of the application 112n may then send a request to access that application (e.g., to access the content or other data associated with that application 112n) to content provisioning module 122, where the request includes the device identifier. In one embodiment, access enabler module 114n may generate the device identifier (e.g., by encrypting or otherwise performing an algorithmic calculation (e.g., a hash) based on the identifier 118 as discussed above). If such an encryption or algorithmic calculation is performed by access enabler module 114n it may be performed in the same manner (e.g., using the same encryption, hash, algorithm, etc.) as that performed by access enabler module 114a such that the device identifier is regenerated by access enabler module 114n.

The request to access the application 112n including the device identifier is received from the computing device 110 at the access module 124. When this request is received the access module 124 may determine whether a user associated with the device 110 has been previously authenticated. This determination may be made by determining if there is any login tracking data 126 (or user credentials) associated with the device identifier included in the request from access enabler module 114n associated with application 112n.

As discussed above, as a user has been previously authenticated with respect to the access of application 112a, in this case it can be determined that a login identifier is stored in association with the device identifier received in the access request (for application 112n) in login tracking data 126. Thus, it can be determined that a user associated with device 110 has been previously authenticated.

Accordingly, the user may be allowed access to application 112n (e.g., application 112n may be allowed to access data 128 on platform 120 associated with the application 112n) without further authentication based on the determination that the user has been previously authenticated. More specifically, in one embodiment, the login identifier associated with the device identifier (received in the request from application 112n) stored in login tracking data 126 may be returned to the access enabler module 114n which, in turn, may provide this login identifier to the application 112n. The application 112n can then use this login identifier for subsequent requests to platform 120 which will respond to requests including (or otherwise referencing or associated with) the login identifier. It can be appreciated that application 112n can use the login identifier to access data 128 without further need for authentication. That is, access module 124 does not require application 112n participate in a separate user credential verification process to access data 128 associated with application 112n. In this manner, a user may access multiple applications on his device while only being authenticated a single time.

It can be noted that if the user uses different credentials for application 112n than 112a, then, in some embodiments, access module 124 can pass an indication of the association between the user and login identification to content provisioning module 122 (for example, by passing a user name associated with the user for application 112n to content provisioning module 122) so that content provisioning module 122 can enforce security criteria and/or data policies when application 112n uses a login identifier in the same manner as if the user had logged to platform 120 through application 112n using credentials, such as a user name and password.

As such authentication or other access controls may be a pre-requisite to access a platform, multiple applications provided by a platform, or multiple platforms; it may be efficient from both a time and hardware perspective to implement embodiments of access controls using an architecture that divorces these access controls from the functionality of the content provisioning platform itself.

Figure 2:
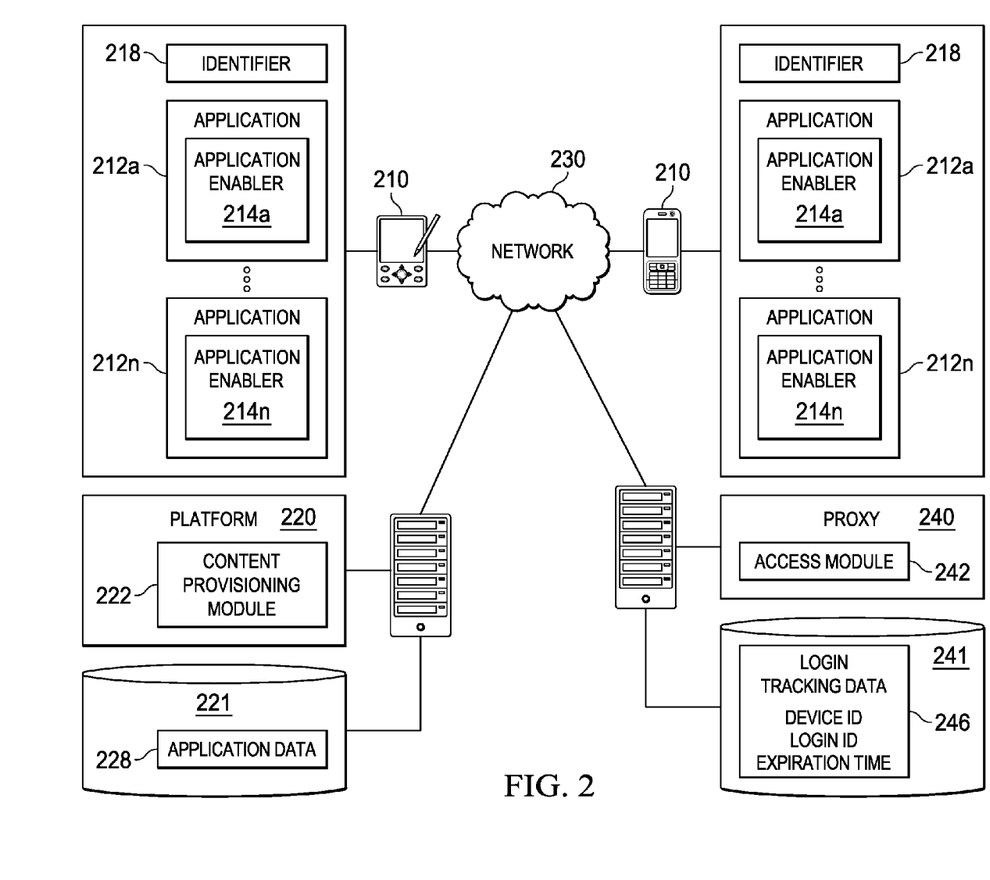
FIG. 2 is a block diagram illustrating one embodiment of a topology for access control.

One embodiment of just such an architecture 200 is depicted in FIG. 2. The architecture 200 includes one or more computing devices 210 connected to a proxy system 240 and content provisioning platform 220 over a network 230. In some embodiments, content provisioning platform 220 may be behind proxy system 240 so that, for example, proxy system 240 is connected to user devices over network 230 and to content provisioning platform 220 by a second network (e.g., an internal LAN or other network). Furthermore, proxy system 240 may provide access controls for multiple applications provided by a platform or for multiple platforms.

Platform 220 may include one or more content provisioning modules 222 accessible at one or more locations (e.g., IP addresses or domain names) or through one or more interfaces. The modules of a particular platform 220 may be deployed on physical computing devices residing at a particular location (such as those associated with a mobile application provider) or may be deployed in a cloud. Thus, when a platform 120 is deployed in the cloud, one or more content provisioning modules 122 may be executing on a virtual machine provided in the cloud, where the virtual machine is addressable at one (or more) location(s). In some embodiments, platform 220 may comprise an enterprise system in which content provisioning modules 222 comprise one or more enterprise applications that access enterprise data.

Content provisioning module 222 of a platform 220 may support access from applications 212 (e.g., application 212*a*, application 212*n*) on a computing device 210. In other words, users at computing devices 210 may activate an application 212 on their computing device 210 to access content provisioning module 222 (or which may access content provisioning module 222 during execution, etc.). In response to such access, content provisioning module 222 may provide application data 228 from data store 221 to the accessing application 212 at the computing device 210. As discussed above, for example, content provisioning module 222 may comprise a content management system that provides access, control and management of documents in data store 221.

Proxy system 240 may be a proxy server or other type of proxy for platform. Accordingly, proxy system 240 may be configured to receive requests intended for platform 220 (e.g., requests intended for platform 220 may be received by, or directed to, proxy system 240). As proxy system 240 may receive requests intended for platform 220, proxy system 240 may comprise an access device including access module 242 to control access from applications 212 on computing devices 210 to content provisioning module 222 on platform 220.

Access module 242 may be configured to receive requests for access from applications 212 (which may be referred to as accessing an application) at proxy system 240, determine if a user at a computing device 210 has been authenticated, request and receive user credentials, authenticate a user, access (including store) login tracking data 226 and allow (or deny) access to content provisioning module 222.

As described above, each computing device 210 may include multiple applications 212. In some embodiments, applications 212 on a particular computing device 210 may be independent from each other such that they cannot share user credentials. For example, in some embodiments, applications 212 on a particular computing device 210 may be sandboxed such that access to user data and system resources at computing device 210 is limited on a per-application basis. It can be appreciated that, in some cases, computing device 210 may further include other applications (not shown) that do not participate in the access control process.

Computing devices 210 may include an identifier 218 uniquely identifying the computing device 210, and multiple applications 212. Each application 212 may include an access enabler module 214 (e.g., access enabler module 214*a*, access enabler module 214*n*) configured to interact with access module 242 to control access to content provisioning module 222 of platform 220.

Access enabler module 214 may be configured to access the identifier 218 on the device 210, send a device identifier to the access module 242, receive a request for user credentials from the access module 242, send the user credentials to the access module 242, receive a login identifier from the access module 242 and provide the login identifier to an application 212 for use in accessing content from content provisioning module 222.

Accordingly, when a user of computing device 210 wishes to utilize an application 212*a* on his computing device 210 he may activate the application (e.g., tapping or clicking on an icon, using a command on a command line, etc.). At some point during execution of the application 212*a* then (e.g., on initial startup of the application 212*a*, when the application 212*a* first requires particular data, etc.) the application 212*a* may require access to content provisioning module 222.

When the application 212*a* first attempts to access content provisioning module 222, access enabler module 214*a* may access the identifier 218 on the computing device 210. The access enabler module 214*a* may then send a request to access that application data (e.g., a request to access the content or other data associated with that application 212*a*) to content provisioning module 222, where the request includes a device identifier (which may be algorithmically generated by access enabler module 214*a* based on the identifier 218 as discussed above).

The request to access the application 212*a* including the device identifier is received from the computing device 210 at proxy system 240 and provided to the access module 242. When such a request is received the access module 242 may determine whether a user associated with the device identifier has been previously authenticated. This determination may be made by determining if there is any login tracking data 246 in data store 241 associated with the device identifier included in the request received from the application 212*a*.

If there is no login tracking data 246 associated with the device identifier included in the received request, a request for a user credential along with a login identifier to allow access to the content provisioning module 222 may be returned to the access enabler module 214*a* from which the initial access request was received. The access enabler module 214*a* may then request a user credential from the user of the computing device 210 through the application 212*a*. This request may be initiated, for example, by presenting an interface (e.g., a login or authorization interface) associated with the application 212*a*.

The access enabler module 214*a* may then return this user credential to the access module 242 (e.g., by sending the user credential so it is received at proxy system 240). When the user credential is received at proxy system 240 from the access enabler module 214*a* at the computing device 210 the user may be authenticated using the user credential (e.g., by comparing the received user credential to authorized user credentials). If the user cannot be authenticated, an error message may be returned to the access enabler module 214*a* and the access enabler module 214*a* may attempt to repeat the authentication, deny a user access to the application 212*a* or take some other action.

If, however, the user credentials can be authenticated access module 242 stores this login identifier in association with the device identifier (e.g., associated with computing device 210) received in the initial access request in login tracking data 246. Additionally, in one embodiment, an expiration time may be associated with the login identifier and the device identifier in login tracking data 246, such that when the expiration time has elapsed the associated login identifier and device identifier may be removed from login tracking data 246.

The application 212a may thus utilize the login identifier in subsequent accesses to content provisioning module 222 to access the application data 228 associated with the application 212a. In some embodiments, requests by application 212a may be received by or directed to proxy system 240. Proxy system 240 can login to platform 220 (e.g., using the stored credentials) and interact with content provisioning module 222 on behalf of application 212a and return responses to application 212a.

In some embodiments, access can be based on security criteria and/or data policies. As discussed above, in cases in which application 212a interacts with a content provisioning module 222, proxy system 240 may provide some indication to content provisioning module of the association between a login identifier and user so that security criteria and/or data policies can be applied to requests using the login identifier. If proxy system 240 interacts with content provisioning module 222 on behalf of application 212a, the security criteria and/or data policies can be applied based on the credentials provided by proxy system 240.

At some subsequent point, then, a user of computing device 210 may wish to utilize a different application 212n on his computing device 210 and may activate the other application 212n. During execution of the application 212n, the application 212n may also require access to content provisioning module 222.

When this application 212n first attempts to access content provisioning module 222, access enabler module 214n may access the identifier 218 on the computing device 210. The access enabler module 214n of the application 212n may then send a request to access that application (e.g., to access the content or other data associated with that application 212n) to content provisioning module 222, where the request includes the device identifier (which may be algorithmically (re)generated by access enabler module 214n based on the identifier 218 as discussed above).

The request to access the application 212n including the device identifier is received from the computing device 210 at the proxy system 240 and provided to access module 242. When this request is received, the access module 242 may determine whether a user associated with the device 210 has been previously authenticated. This determination may be made by determining if there is any login tracking data 246 associated with the device identifier included in the request from access enabler 214n associated with application 212n.

As discussed above, as a user has been previously authenticated with respect to the access of application 212a, in this case it can be determined that a login identifier is stored in association with the device identifier received in the access request (for application 212n) in login tracking data 246. Thus, it can be determined that a user associated with device 210 has been previously authenticated.

Accordingly, the user may be allowed access to application 212n (e.g., application 212n may be allowed to access application data 228 on platform 220 associated with the application 212n) without further authentication based on the determination that the user has been previously authenticated. More specifically, in one embodiment, the login identifier associated with the device identifier (received in the request from application 212n) stored in login tracking data 246 may be returned from proxy system 240 to the access enabler module 214n which, in turn, may provide this login identifier to the application 212n.

The application 212n can then use this login identifier for subsequent requests to platform 220. In some embodiments, requests by application 212n may be received by, or directed to, proxy system 240. Proxy system 240 can interact with content provisioning module 222 on behalf of application 212n and return responses to application 212n without further need for authentication. That is, proxy system 240 does not require application 212n to participate in a separate user credential verification process to access application data 228 associated with application 212n, though proxy system 240 may participate in a verification process with platform 220 so that proxy system 240 can access the data.

As discussed above, in cases in which application 212n interacts with a content provisioning module 222, proxy system 240 may provide an indication to content provisioning module 222 of the association between a login identifier and user (e.g., a user name stored for application 212n) so that security criteria and/or data policies can be applied to requests using the login identifier. If proxy system 240 interacts with content provisioning module 222 on behalf of application 212a, the security criteria and/or data policies can be applied based on the credentials provided by proxy system 240.

It should be noted here that while, in embodiments described, application enabler module 214 of an application 212 may send an access request including the device identifier when the application 212 first requires application data 228 from platform 220, other configurations may be utilized as well. For example, access module 242 may send a request for such a device identifier to access enabler module 214 when such a device identifier may be required (e.g., when an access request contains no login identifier or an invalid or expired login identifier, etc.). Thus, in some embodiments, a device identifier may be returned by access enabler module 214 only when requested by access module 242.

Figure 3:
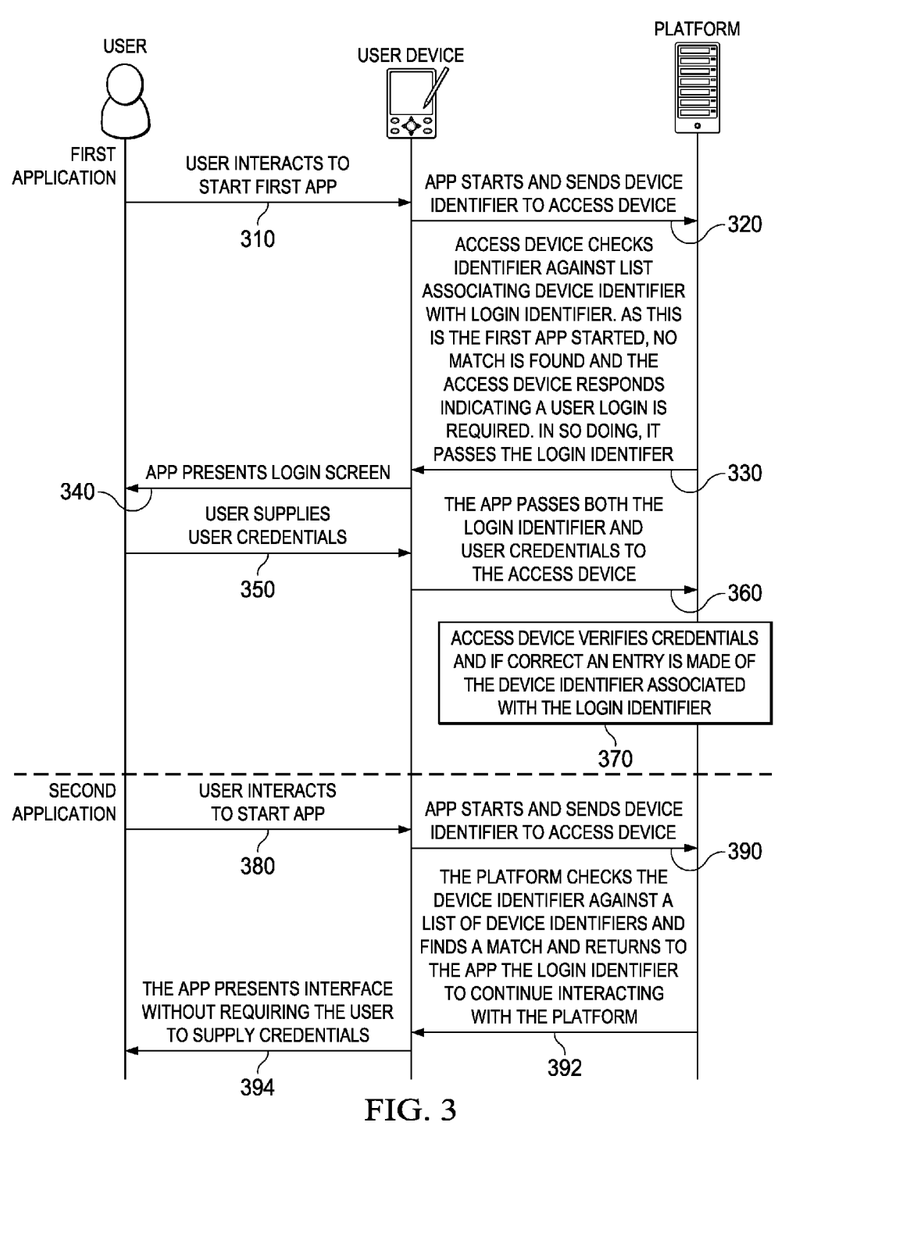
FIG. 3 is a graphical illustration of one embodiment of a method for access control.

Moving now to FIG. 3, a graphical depiction of one method of controlling access from multiple applications is depicted. Initially, at step 310, a user may interact with an application on his device to start the application (which will be referred to for purposes of this depiction as a first application). This first application may start up and request access to the first application (e.g., request data associated with the first application) from a platform at step 320. This request includes a device identifier uniquely associated with the device.

This request, including the device identifier is received by the platform at step 330 and the device identifier is checked against a list associating device identifiers with login identifiers. As this is the first application accessed, no match is found and the platform requests a user credential. A login identifier such as a session ID may be included in the request.

When the first application receives this request at the device, the first application may present a login interface to the user at step 340. The user may supply a user credential using this interface at step 350 and the application may pass both the previously received login identifier and the user credential to the platform at step 360.

The platform may authenticate the received user credential and if the user can be authenticated (e.g., logged in) the device identifier for the device and the login identifier may be stored at step 370. The user at the device can then access the platform using the first application. In some embodiments, the user credential received from the user may be used to login the user to allow access to the first application and may also be stored in association with the device identifier and login identifier.

At some point then, at step 380, a user may interface with another application on his device to start the application (which will be referred to for purposes of this depiction as a second application). This second application may start up and request access to the second application (e.g., request data associated with the second application) from a platform at step 390. This request includes the device identifier uniquely associated with the device.

This request, including the device identifier, is received by the platform at step 392 and the device identifier is checked against a list associating device identifiers with login identifiers. As the user of the device has been previously authenticated in conjunction with the first application, a match may be found for the device identifier (e.g., there will be a login identifier such as a session ID, or user credential stored in associated with the device identifier). The login identifier may be returned to the second application. In some embodiments, the platform may also login a user to allow access to the second application using the stored user credentials. The second application can then present the interface of that application at step 394 without requiring a user to be authenticated and the second application may communicate with the platform to request and receive application data using the provided login identifier.

Figure 4:
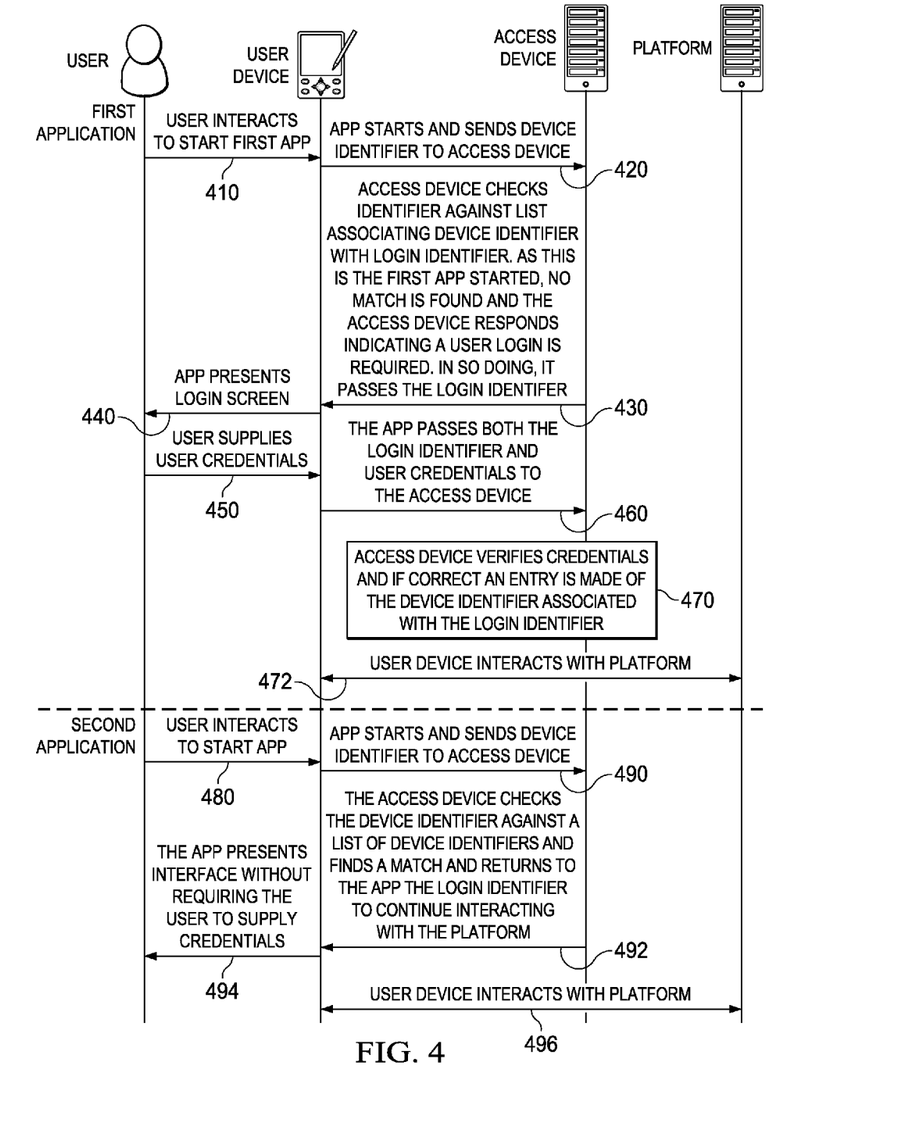
FIG. 4 is a graphical illustration of one embodiment of a method for access control.

Moving now to FIG. 4, a graphical depiction of one method of controlling access from multiple applications is depicted. Initially, at step 410, a user may interact with an application on his device to start the application (which will be referred to for purposes of this depiction as a first application). This first application may start up and request access to the first application (e.g., request data associated with the first application) from an access device at step 420. This request includes a device identifier uniquely associated with the device.

This request, including the device identifier is received by the access device at step 430 and the device identifier is checked against a list associating device identifiers with login identifiers. As this is the first application accessed, no match is found and the access device requests a user credential. A login identifier such as a session ID may be included in the request.

When the device application receives this request at the device, the application may present a login interface to the user at step 440. The user may supply a user credential using this interface at step 450 and the application may pass both the previously received login identifier and the user credential to the access device at step 460.

The access device may authenticate the received user credential and if the user can be authenticated (e.g., logged in) the device identifier for the device and the login identifier may be stored at step 470. The user at the device can then access the platform using the first application at step 472. In some embodiments, the user credential received from the user may be used to login the user to allow access to the first application and may also be stored in association with the device identifier and login identifier.

At some point then, at step 480, a user may interface with another application on his device to start the application (which will be referred to for purposes of this depiction as a second application). This second application may start up and request access to the second application (e.g., request data associated with the second application) from the access device at step 490. This request includes the device identifier uniquely associated with the device.

This request, including the device identifier, is received by the access device at step 492 and the device identifier is checked against a list associating device identifiers with login identifiers. As the user of the device has been previously authenticated in conjunction with the first application, a match may be found for the device identifier (e.g., there will be a login identifier such as a session ID, or user credential stored in associated with the device identifier). The login identifier may be returned to allow access to the second application. In some embodiments, the access device may also login a user to the platform to allow access to the second application using the stored user credentials. The second application can then present the interface of that application at step 494 without requiring a user to submit user credentials for the second application. The second application may communicate with the platform at step 496 to request and receive application data using the provided login identifier.

Figure 5A:
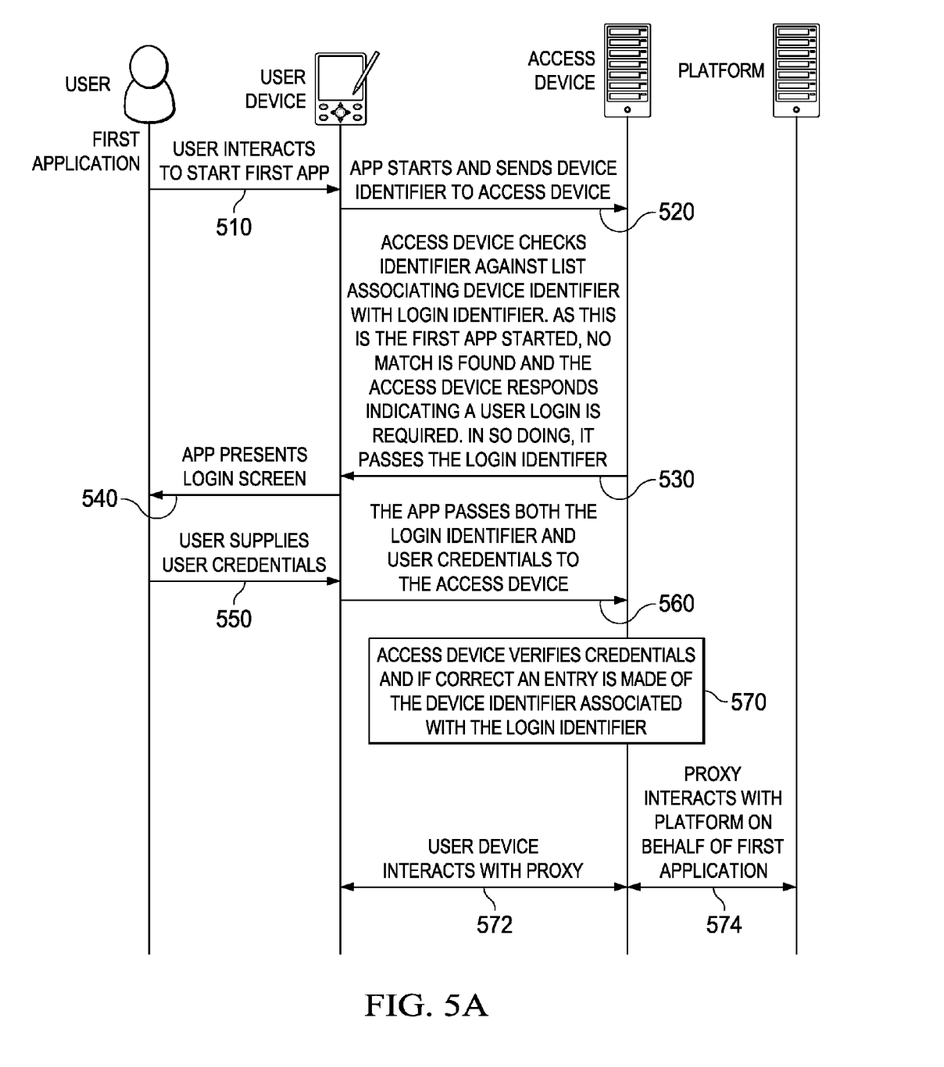
FIG. 5A and FIG. 5B are graphical illustrations of one embodiments of a method for access control.
Figure 5B:
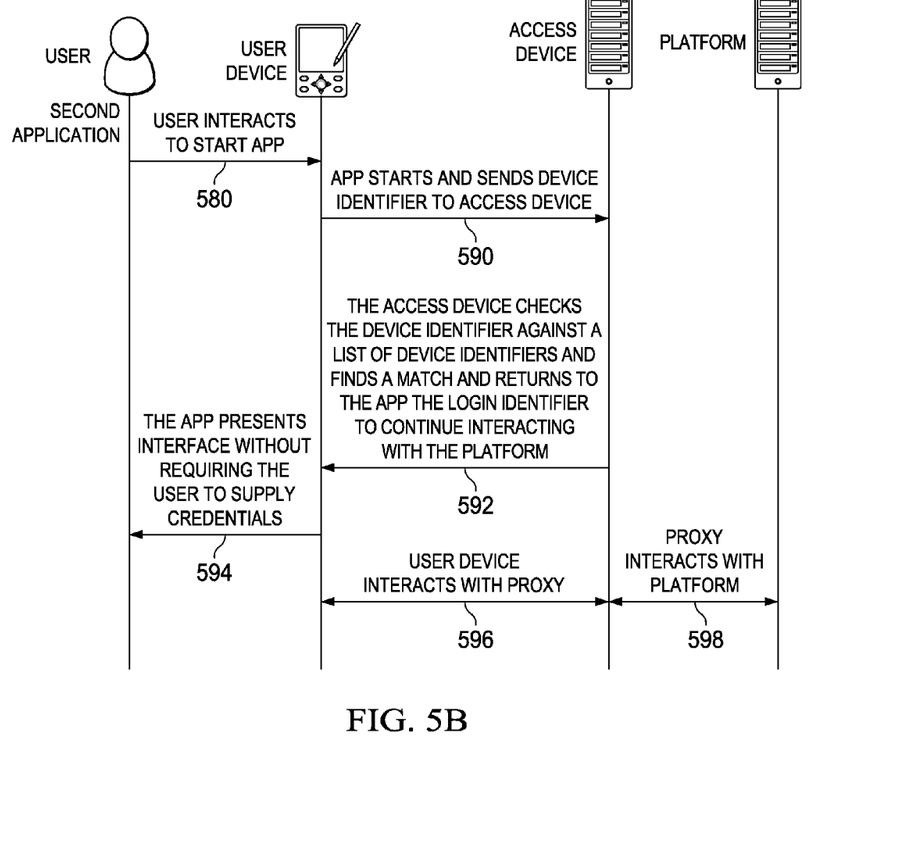

Moving now to FIG. 5A and FIG. 5B, a graphical depiction of one method of controlling access from multiple applications is depicted. Initially, at step 510, a user may interact with an application on his device to start the application (which will be referred to for purposes of this depiction as a first application). This first application may start up and request access to the first application (e.g., request data associated with the first application) from access device at step 520. This request includes a device identifier uniquely associated with the device.

This request, including the device identifier is received by the access device at step 530 and the device identifier is checked against a list associating device identifiers with login identifiers. As this is the first application accessed, no match is found and the access device requests a user credential. A login identifier such as a session ID may be included in the request.

When the device application receives this request at the device, the application may present a login interface to the user at step 540. The user may supply a user credential using this interface at step 550 and the application may pass both the previously received login identifier and the user credential to the access device at step 560.

The access device may authenticate the received user credential and if the user can be authenticated (e.g., logged in) the device identifier for the device and the login identifier may be stored at step 570. The user at the device can then interact with the access device using the first application at step 572. In some embodiments, the user credential received from the user may be used to login the user to allow access to the first application and may also be stored in association with the device identifier and login identifier so that the user can interact with the platform via the proxy at step 572.

Turning to FIG. 5B, at some point then, at step 580, a user may interface with another application on his device to start the application (which will be referred to for purposes of this depiction as a second application). This second application may start up and request access to the second application (e.g., request data associated with the second application) from the access device at step 590. This request includes the device identifier uniquely associated with the device.

This request, including the device identifier, is received by the access device at step 592 and the device identifier is checked against a list associating device identifiers with login identifiers. As the user of the device has been previously authenticated in conjunction with the first application, a match may be found for the device identifier (e.g., there will be a login identifier such as a session ID, or user credential stored in associated with the device identifier). The login identifier may be returned to the second application. In some embodiments, the access device may also login a user to allow access to the second application using the stored user credentials. The second application can then present the interface of that application at step 594 without requiring a user to be authenticated. The user device may then interact with the access device at step 594 to request or store application data using the provided login identifier and the access device may interact with the platform at step 596 to forward requests from and responses to the user device.

Routines, methods, functions, steps, operations or portions thereof described herein can be implemented through control logic adapted to direct a computing device to perform the routines, methods, functions, steps, operations or portions thereof. Control logic can include computer executable instructions stored on a computer readable medium that can be operated on by a processor, hardware, firmware or a combination thereof. The control logic can include, in some embodiments, application specific integrated circuits, programmable logic devices, field programmable gate arrays, optical, chemical, biological, quantum or nanoengineered systems, components and mechanisms. Any suitable language can be used. Different programming techniques can be employed such as procedural or object oriented. Based on the disclosure and teachings provided herein, a person of ordinary skill in the art will appreciate other ways and/or methods to implement the invention.

Any particular step, operation, method, routine, operation or portion thereof can execute on a single computer processing device or multiple computer processing devices, a single computer processor or multiple computer processors. Data may be stored in a single storage medium or distributed through multiple storage mediums, and may reside in a single database or multiple databases (or other data storage). The sequence of operations described herein can be interrupted, suspended, or otherwise controlled by another process, such as an operating system, kernel, etc.

A "computer-readable medium" may be any type of data storage medium that can store computer instructions, including, but not limited to read-only memory (ROM), random access memory (RAM), hard disks (HD), data cartridges, data backup magnetic tapes, floppy diskettes, flash memory, optical data storage, CD-ROMs, or the like. The computer readable medium may include multiple computer readable media storing computer executable instructions, such as in a distributed system or instructions stored across an array.

A "processor" includes any hardware system, hardware mechanism or hardware component that processes data, signals or other information. A processor can include a system with a central processing unit, multiple processing units, dedicated circuitry for achieving functionality, or other systems. A processor can perform its functions in "real-time," "offline," in a "batch mode," etc. Portions of processing can be performed at different times and at different locations, by different (or the same) processing systems.

It will be understood for purposes of this disclosure that a service or module is one or more computer devices, configured (e.g., by a computer process or hardware) to perform one or more functions. A service may present one or more interfaces which can be utilized to access these functions. Such interfaces include APIs, interfaces presented for a web services, web pages, remote procedure calls, remote method invocation, etc.

Communications between computers implementing embodiments of the invention can be accomplished using any electronic, optical, radio frequency signals, or other suitable methods and tools of communication in compliance with network and other communications protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. That is, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present).

As used herein, a term preceded by "a" or "an" (and "the" when antecedent basis is "a" or "an") includes both singular and plural of such term unless the context clearly dictates otherwise. Also, as used in the description herein, the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. Moreover, it will be appreciated that in some instances some features of embodiments of the invention will be employed without a corresponding use of other features without departing from the scope and spirit of the invention as set forth.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

It is to be understood that other variations and modifications of the embodiments described and illustrated herein are possible in light of the teachings herein and are to be considered as part of the spirit and scope of the invention. Thus, while the invention has been described herein with reference to particular embodiments thereof, a latitude of modification, various changes and substitutions are intended in the foregoing disclosures, and therefore, many modifications may be made to adapt a particular situation or material to the essential scope and spirit of the invention. Accordingly, the specification, including the Summary and Abstract, and figures are to be regarded in an illustrative rather than a restrictive sense, and all such modifications are intended to be included within the scope of invention.

What is claimed is:

1. A method for controlling access to a target system, comprising:
    at an access device including a hardware processor, receiving a first request over a network from a user device in a first communication session, the first request comprising a request on behalf of a first application on the user device to access a platform, the first request including a device identifier uniquely identifying the user device;
    the access device authenticating a user of the user device using a user credential associated with the user;
    the access device storing the device identifier in association with a login identifier in response to authentication of the user;
    the access device receiving a second request from the user device over the network in a second communication session, the second request comprising a request on behalf of a second application on the user device to access the platform, the second request in the second communication session including the device identifier;
    the access device determining that the user has previously authenticated based on a match between the device identifier received in the second request in the second communication session and the device identifier stored in association with the login identifier; and
    the access device allowing the second application to access to the platform based on the determination that the user previously authenticated, without requiring a separate user credential verification for the second application.

2. A method in accordance with claim 1, further comprising the access device sending a user credential request and the login identifier to the first application in response to the first request and receiving a response including a user credential and the login identifier from the first application.

3. A method in accordance with claim 2, further comprising the first application on the user device using the login identifier in subsequent accesses to the platform to access application data associated with the first application.

4. A method in accordance with claim 1, further comprising:
    the access device sending the login identifier to the second application in response to determining that the user previously authenticated; and
    the second application on the user device using the login identifier in subsequent accesses to the platform to access application data associated with the second application.

5. A method in accordance with claim 1, wherein allowing the second application to access to the platform comprises the access device logging in to the platform on behalf of the second application.

6. A method in accordance with claim 1, wherein the first application and second application are independent applications.

7. A method in accordance with claim 1, further comprising expiring the login identifier.

8. A method in accordance to claim 1, wherein the platform includes an enterprise system comprising at least one enterprise application and accessing enterprise data, the access device enabling access to the enterprise system based on enterprise security criteria and/or data policies.

9. A system for controlling access to a target system, comprising:
    an access device in communication with a platform, the access device including a hardware processor and configured to:
    receive a first request from a user device in a first communication session, the first request comprising a request to access the platform on behalf of a first application on the user device, the first request including a device identifier that uniquely identifies the user device;
    authenticate a user of the user device using a user credential associated with the user;
    store the device identifier in association with a login identifier in response to authentication of the user;
    receive a second request from the user device in a second communication session, the second request comprising a request to access the platform on behalf of a second application on the user device, the second request including the device identifier; and
    compare the device identifier stored in association with the login identifier and the device identifier received in the second request in the second communication session and, in response to determining a match exists, allow access to the platform on behalf of the second application without a separate credential verification for the second application.

10. A system in accordance with claim 9, wherein the access device is configured to send a user credential request and the login identifier to the first application in response to the first request and receive a response including the user credential and the login identifier from the first application.

11. A system in accordance with claim 9, wherein the access device is configured to send the login identifier to the second application in response to determining that the user previously authenticated.

12. A system in accordance with claim 9, further comprising the user device coupled to the access device by the network, wherein the first application and second application are independent applications on the user device.

13. A system in accordance with claim 12, wherein the first application is configured to receive the login identifier from the access device and use the login identifier in subsequent accesses to the platform to access application data associated with the first application.

14. A system in accordance with claim 12, wherein the second application is configured to receive the login identifier from the access device and use the login identifier in subsequent accesses to the platform to access application data associated with the second application.

15. A system in accordance with claim 9, wherein the access device is configured to log in to the platform on behalf of the second application.

16. A system in accordance with claim 9, wherein the access device is configured to expire the login identifier.

17. A system in accordance with claim 9, wherein the platform includes an enterprise system comprising at least one enterprise application configured to access enterprise data and the access device is configured to enable access to the enterprise system based on enterprise security criteria and/or data policies.

18. A computer program product comprising a non-transitory computer readable medium storing a set of computer instructions executable by a processor to perform a method comprising:

receiving a first request over a network from a user device in a first communication session, the first request comprising a request on behalf of a first application on the user device to access a platform, the first request including a device identifier that uniquely identifies the user device;

authenticating a user of the user device using a user credential associated with the user;

storing the device identifier in association with a login identifier in response to authentication of the user;

receiving a second request from the user device over the network in a second communication session, the second request comprising a request on behalf of a second application on the user device to access the platform, the second request including the device identifier;

determining that the user has previously authenticated based on a match between the device identifier received in the second request in the second communication session and the device identifier stored in association with the login identifier; and allowing the second application to access to the platform based on the determination that the user previously authenticated, without requiring a separate user credential verification for the second application.

19. A computer program product in accordance with claim 18, wherein the method further comprises sending a user credential request and the login identifier to the first application in response to the first request and receiving a response from the first application including the user credential and the login identifier.

20. A computer program product in accordance with claim 18, wherein the method further comprises sending the login identifier to the second application in response to determining that the user previously authenticated.

21. A computer program product in accordance with claim 18, wherein allowing the second application to access to the platform comprises logging in to the platform on behalf of the second application.

22. A computer program product in accordance with claim 18, wherein the first application and second application are independent applications.

23. A computer program product in accordance with claim 18, wherein the device identifier is based at least in part on an identifier unique to the user device.

24. A computer program product in accordance with claim 18, further comprising expiring the login identifier.

25. A computer program product in accordance with claim 18, wherein the platform includes an enterprise system comprising at least one enterprise application configured to access enterprise data and the method further comprises enabling access to the enterprise system based on enterprise security criteria and/or data policies.

* * * * *